United States Patent [19]

Kempf

[11] Patent Number: 4,795,237
[45] Date of Patent: Jan. 3, 1989

[54] OPTICAL INSPECTION METHOD WITH SIDE-VIEWING MIRROR

[75] Inventor: Paul S. Kempf, P.O. Box 690, San Diego, Calif. 92075-0690

[73] Assignees: Paul Stuart Kempf; Pilar Moreno Kempf Family Trust

[21] Appl. No.: 53,813

[22] Filed: May 26, 1987

[51] Int. Cl.⁴ .............................................. G02B 5/08
[52] U.S. Cl. .................................. 350/320; 350/640; 350/506
[58] Field of Search ............... 350/320, 640, 631, 506; 362/138, 139; D16/130, 135; 248/466, 471; 273/163 R, 194 A

[56] References Cited

U.S. PATENT DOCUMENTS

| | | | |
|---|---|---|---|
| D. 173,045 | 9/1954 | Smart | D16/130 |
| D. 183,305 | 8/1958 | Fisher | D16/130 |
| D. 186,620 | 11/1959 | Wittie | D16/130 |
| D. 279,131 | 6/1985 | McDavis | D16/130 |
| 2,196,936 | 4/1940 | Nash | 362/139 |
| 2,428,975 | 10/1947 | Lamb | 350/640 |
| 4,686,565 | 8/1987 | Ando | 350/506 |

OTHER PUBLICATIONS

Ullman Devices, Tool catalogue, No. 84, pp. 2-3.

Primary Examiner—Jon W. Henry
Attorney, Agent, or Firm—Brown, Martin, Haller & Meador

[57] ABSTRACT

An optical inspection method particularly suitable for viewing objects such as components on printed circuit boards, comprises the steps of viewing an object from above with a magnifying optical device and at the same time placing a side-viewing mirror in the optical path of the optical device facing the side of the object and tilted at an angle up to 90 degrees to the optical path so as to rotate an image of the side of the object by at least 90 degrees to present simultaneous front and side views of the object to an observer.

4 Claims, 2 Drawing Sheets

U.S. Patent  Jan. 3, 1989  Sheet 2 of 2  4,795,237
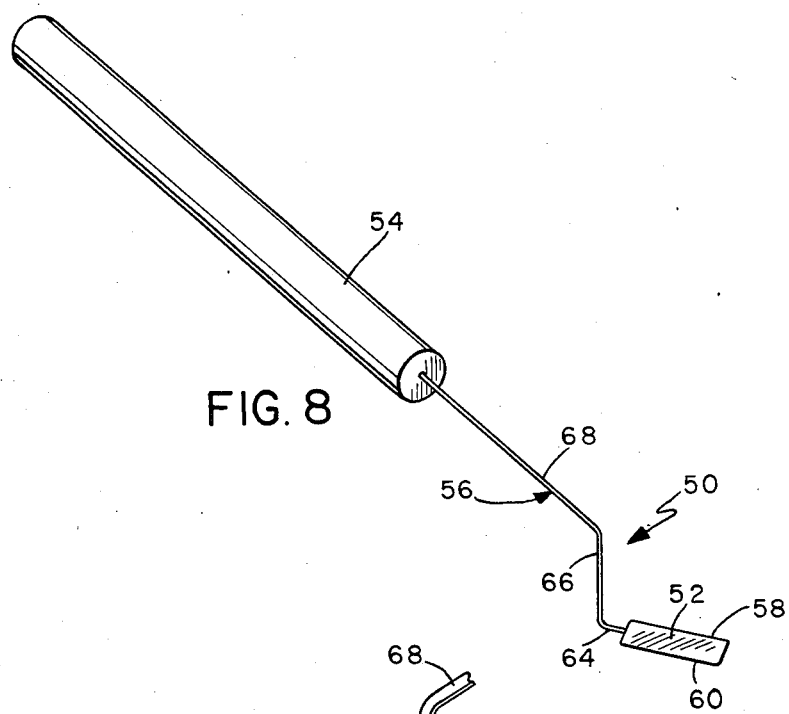
FIG. 8
FIG. 9
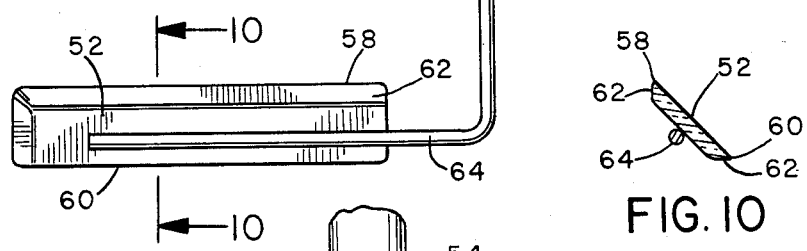
FIG. 10
FIG. 11
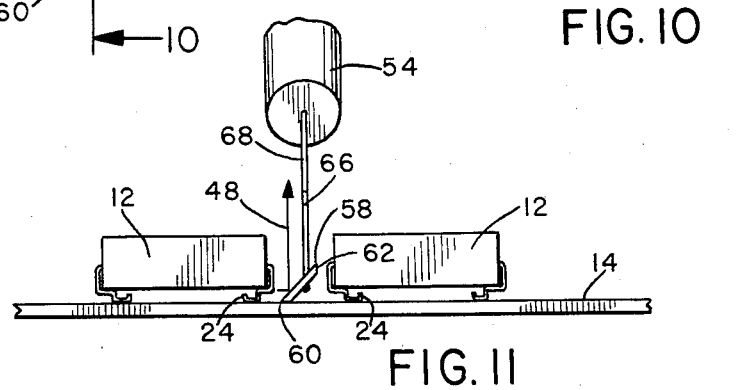

OPTICAL INSPECTION METHOD WITH SIDE-VIEWING MIRROR

BACKGROUND OF THE INVENTION

The present invention relates generally to an optical inspection method and apparatus for inspecting objects such as small components on printed circuit boards, and is particularly directed to a mirror for use in such a method.

The inspection of complex components such as are found on electronic printed circuit boards is tedious and requires careful scrutiny by the operator. In standard inspection systems, the operator scans the top of a circuit board from above using a magnifying viewing system. An inspection apparatus of this type is described in my U.S. Pat. No. 4,379,647, entitled Optical Comparator and Inspection Apparatus.

Normal inspection of a printed circuit board involves looking down on the top of the board. The connecting leads which project from the sides of the components can therefore be inspected. However, in order to save space on the board components are now becoming much smaller with the development of so-called surface mount devices (SMDs), which are mounted very close to the board. The method of connecting these miniaturized components to the board has also been changed. Soldering is accomplished by several methods all designed to make the connection between the SMD components and the circuit board traces on the same side of the board as the component, and to make the connection take up as small an area as possible. In some cases the component is cemented to the circuit board before soldering. In other cases the component is held in place by solder paste for soldering. The solder is generally preprinted on the circuit board as a paste on solder pads on the board. Methods used to melt the preprinted solder include vapor phase, infrared and reflow techniques. However, in all of these techniques problems such as solder spatter, failure to "wick", and thermal cracks can occur, and good visual inspection is required in order to locate such problems. Additionally, some components now employ so-called "J" leads which are tucked under the edge of the component and thus cannot be inspected from above.

Standard inspection techniques for checking printed circuit boards involving looking straight down at the board are thus often insufficient in the latest boards employing surface mount devices, especially with "J" type leads where the soldering cannot be seen by looking straight down. One way of observing such leads is by tilting the the circuit board to try to look under the component. This is only partially successful, particularly where components are packed very close together on the board, and is difficult to do past 30 degrees. Most inspection techniques are of the scanning type, where a board moves under an optical viewing device, and any tilting of the board also makes it difficult for the viewer to keep track of inspected areas. Smaller circuit boards, of 4 or 5 square inches in size, can be turned on edge to inspect at 90 degrees, but this only allows components at the edges of the board to be inspected, since other components will block the view of inner components. Larger printed circuit boards cannot be turned on edge in this way because of the physical restrictions of clearance and focal length of the optical viewing instruments. On the larger PCB's which cannot be tilted to 90 degrees on a standard viewing instrument, even hand tilted methods with an eye loupe are not possible past about 45 degrees. This is usually insufficient to verify the integrity of solder joints.

Large PCB's are often inspected on programmable X-Y tables to permit computerized information on the location of errors. This technique almost eliminates the possibility of tilting the PCB since this would change the inspection direction, and thus the location information would be difficult to track.

SUMMARY OF THE INVENTION

It is an object of the present invention to provide an improved method and apparatus for inspecting components on printed circuit boards and the like, which allows the top and sides of the components to be inspected.

According to a first aspect of the present invention, an optical inspection method is provided which comprises the steps of viewing an object form above using a magnifying optical instrument and simultaneously placing a side-viewing mirror in the optical path of the instrument and facing the side of the object, with the bottom edge of the mirror contiguous with the object plane, and tilting the mirror to an angle up to ninety degrees to the optical path so as to rotate an image of the side of the object by at least 90 degrees and present simultaneous top and side views of the object to the viewer.

This method permits viewing of the object through a magnifying optical instrument from the top and also at 90 degrees to the optical path while keeping both viewing directions in focus simultaneously. The observer can inspect the PCB components from all sides up to 90 degrees, and will be able to see the solder joints beneath components having J lead connections. The method can also be used on programmable X-Y tables to permit computerized fault location, by holding the side viewing mirror in the optical path against the board as the board scans past in the X or Y direction.

According to another aspect of the present invention a side-viewing mirror device designed for use in the above inspection method is provided. The side viewing mirror device according to the invention comprises a front surface mirror having a reflective front surface and a non-reflective rear surface, and at least one edge shaped to conform to the shape of the object plane, so that it can be placed with its edge contiguous to that plane facing the side of an object to be inspected. The edge is straight in the preferred embodiment so that it can be placed against a printed circuit board (PCB) with the mirrored front surface facing the side of a component on the board.

A handle is secured at one end to the mirror for allowing a user to position the mirror on a PCB at a suitable angle to the optical path of a viewing instrument. The handle extends at an angle to the straight edge of the mirror so that when the edge is placed against the board, the handle projects upwardly at an angle to the board for easy handling by a user. In one embodiment the handle extends in the plane of the mirror and is preferably at an angle of 45 degrees to the straight, bottom edge of the mirror. This allows easy manipulation of the mirror and also keeps the handle out of the optical path. Alternatively, the handle may be secured to the mirror via a bent shaft so that the handle projects at the desired 45 degrees angle to the straight edge.

In one embodiment, the mirror has a second straight edge at an angle of 90 degrees to the first edge and 45 degrees to the axis of the handle, extending on the opposite side of the handle axis to the first edge. This allows right or left handed use of the mirror. The first and second straight edges are preferably beveled to an angle of at least 45 degrees on the rear face of the mirror to allow the mirrored surface to be tilted while one of the edges remains in contact with the surface of the board, so that the edge of the mirrored surface is contiguous with the object plane at all angles of tilt.

In an alternative embodiment the handle is secured to the mirror via a bent shaft or wire to allow the mirror to be inserted more easily in very small gaps between components. In this version the mirror preferably comprises a thin strip-like member with elongate straight edges and is secured to the end of the handle shaft at an angle to the axis of the handle. As in the first embodiment, the rear surface of the mirror is beveled to an angle of at least 45 degrees adjacent the elongate straight edges, so that either straight edge can be placed against the surface of a PCB.

BRIEF DESCRIPTION OF THE DRAWINGS

The present invention will be better understood from the following detailed description of a preferred embodiment of the invention, taken in conjunction with the accompanying drawings in which like references refer to like parts and in which:

FIG. 8 is a perspective view of an alternative mirror configuration;

FIG. 9 is an enlarged rear elevation view of the mirror head of FIG. 8;

FIG. 10 is a sectional view taken on the line 10—10 of FIG. 9; and

FIG. 11 is a side elevation view of a portion of a circuit board, showing the mirror in use between closely spaced components.

DESCRIPTION OF THE PREFERRED EMBODIMENT

Figure 1:
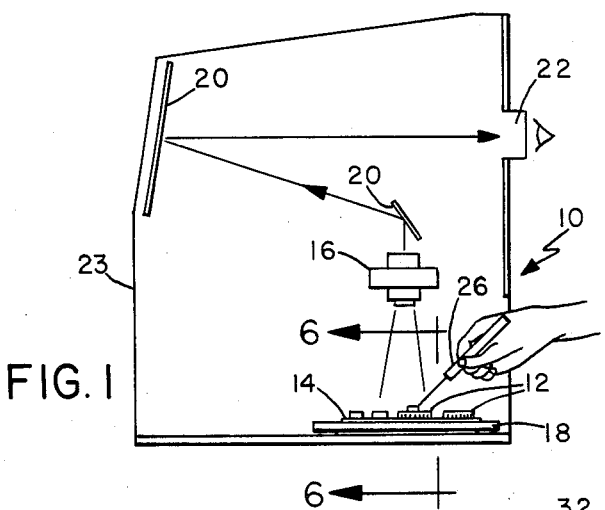
FIG. 1 illustrates schematically an optical inspection system employing a side viewing mirror according to a preferred embodiment of the invention for simultaneous viewing of the top and side of an object.
Figure 2:
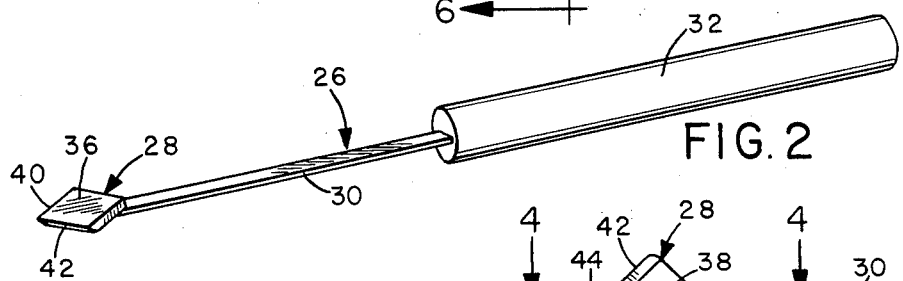
FIG. 2 is a perspective view of the mirror according to a first embodiment.
Figure 3:
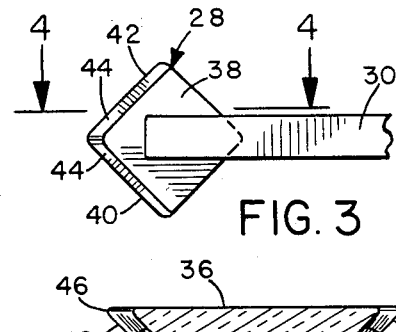
FIG. 3 is an enlarged underside view of the mirror head.
Figure 6:
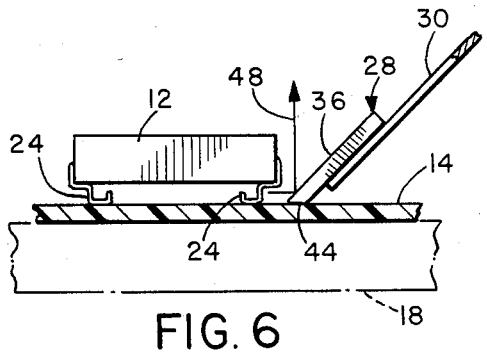
FIG. 6 is an enlarged sectional view taken on line 6—6 of FIG. 1.

FIG. 1 of the drawings illustrates an optical inspection system or apparatus 10 used to inspect components 12 on a printed circuit board 14. The apparatus 10 includes a magnifying optical device 16 directed downwardly towards board 14 which is supported on a platform 18, which may be movable to scan beneath the device 16. A magnified image of the top surface of the board 14 is directed from the device 16 via reflective surfaces 20 to an observer viewing the image through eyepiece 22. The device is typically enclosed in an outer housing 23 as illustrated in FIG. 1. This apparatus is of a standard type which allows PCB components to be viewed from the top only, so that the solder joints of components connected to the PCB via so-called "J" leads 24 (see FIG. 6) are not visible. The method and apparatus of this invention allows inspection of components from any side so that the area underneath a component mounted as shown in FIG. 6 can be viewed, and this method can be used with any PCB inspection technique, such as the apparatus shown schematically in FIG. 1.

The method according to a preferred embodiment of the present invention employs a side viewing mirror device in conjunction with a magnifying optical device. FIGS. 2 to 5 of the drawings illustrate a first embodiment of the side viewing mirror device 26 according to the invention. The mirror device 26 basically comprises a mirror 28 secured via a flat handle shaft 30 to a handle 32 of rounded or cylindrical shape at the opposite end for gripping by the operator as shown in FIG. 1.

Figure 4:
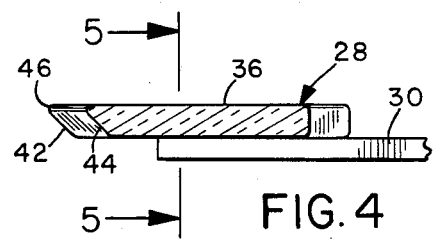
FIG. 4 is an enlarged sectional view taken on line 4—4 of FIG. 3.

The mirror 28 is a first surface mirror having a front reflective surface 36 and a non-reflective rear surface 38. The handle shaft 30 is secured to the rear surface of the mirror, as shown in FIG. 4, with the mirror lying in the plane of the handle shaft. First and second straight bottom edges 40, 42 are provided on the mirror at the extreme end of the device, at an angle of 90 degrees to one another. Each surface 40, 42 is canted at an angle of about 45 degrees to the axis of handle 32, and the surfaces project on opposite sides of the handle axis as shown. The mirror may be of rectangular shape as shown in the drawings, or may be of triangular or other shapes accommodating the two straight bottom edges 40, 42 at the extreme end of the device.

Figure 5:
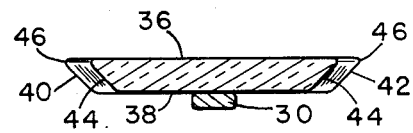
FIG. 5 is a sectional view taken on line 5—5 of FIG. 4.

The rear surface of the mirror is beveled at 44 adjacent the straight edges 40 and 42, as shown in FIGS. 4 and 5, with the bevel going at an angle of at least 45 degrees to the plane of the mirror. The bevels 44 are finished as smooth surfaces, and are carried close to the front surface of the mirror but leaving enough vertical edge or clearance 46 to avoid or restrict chipping problems which a so-called "feather edge" may incur. The front surface of the mirror is preferably also lightly beveled at the straight edges 40 and 42 to restrict chipping.

The mirror is preferably made at the minimum practical thickness for handling without breaking easily, because of space limitations during inspection of small scale components on PCBs, as described in more detail below. In practice the minimum thickness may be of the order of about 0.025 inches or less. The mirror is fastened to the handle by adhesive or the like so as to minimize added thickness to the mirror. In the preferred embodiment shown, the handle shaft 26 is flat so as to minimize thickness.

The use of the side-viewing mirror device 26 in an optical inspection system or method will now be described. With a system 10 as shown in FIG. 1, an operator will grip the rounded handle 32 as shown and position the first edge 40 of the mirror against the printed circuit board at the side of a component 12 closest to the operator with the reflective surface facing the object. The edge 40 may be touching or nearly touching the surface of the PCB. While viewing the object through eyepiece 22, the operator then tilts the mirror surface plus or minus 45 degrees from the vertical or optical axis 48 of the optical device 16 towards the operator, as illustrated in FIGS. 1 and 6. Since the handle axis is at about 45 degrees to the straight edge 40, when this edge is placed flat on the surface the handle will project at about 45 degrees to the surface (see FIG. 1), which is the most comfortable orientation for the operator gripping the handle and additionally keeps the handle out of the optical path.

Figure 7:
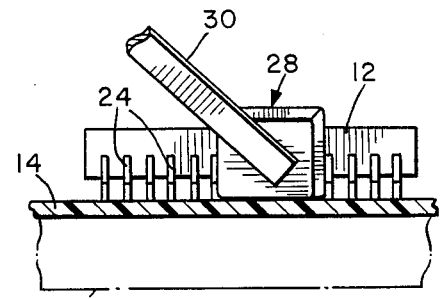
FIG. 7 is a side elevation view of the structure of FIG. 6.

The image in the optical magnifying instrument then shows both the normal "straight down" view of the component and also the image of the side of the part rotated through approximately 90 degrees as seen in the mirror. Both images will be in focus simultaneously at their point of juncture. The bevel 44 at the rear of the mirror adjacent edge 40 allows the mirror to be tilted while edge 40 remains at or close to contact with the board 14 as shown in FIG. 6. Since the mirrored surface extends up the edge 40, the operator sees a full view of the side of component 12 down to the level of the board. Thus each J-lead solder connection can be inspected by sliding the mirror along the edge of the component. If the inspection system is of the scanning type, where board 14 moves on scanning platform 18 from left to right in FIG. 7, for example, the mirror is simply held at the appropriate angle adjacent a side edge of a component with its edge 40 parallel to the direction of movement of the board at or close to the board surface.

If the operator is left-handed, a similar technique is used with edge 42 placed against the board. The 45 degree offset of edges 40 and 42 to the axis of handle 28 allows for easy manipulation and also keeps the handle out of the optical path, as explained above.

If the operator wishes to focus further underneath a component 12, a focus adjustment of the downward facing lens in device 16 will permit an extended view beneath component 12 as far as desired. Angular viewing of more or less than 90 degrees to provide a different view of a particular solder connection, for example, is accomplished by simply tilting the mirror more or less than 45 degrees. In order to provide an oblique view, for example to inspect the corner of an object, the mirror is rotated about the vertical axis to face the corner while tilting it relative to the optical axis as described above.

Once the side of a part closest to the observer has been examined, the other three sides can be inspected in a similar manner by placing the mirror in the path of the view instrument facing the appropriate side and tilting it as shown in FIG. 6 to the appropriate angle. The provision of two perpendicular edges 40 and 42 not only facilitates manipulation of the mirror with the right or left hand, but also allows the mirror to be positioned easily to view any side of the part 12.

The 45 degree bevel 44 on the rear surface adjacent each edge 40 and 42 permits the mirror surface to be tilted while the edge remains essentially coincident or contiguous with the object plane or plane of the PCB, thus extending the mirror surface as close to the board as possible. Frequently, the clearance between the component 12 and the PCB will be quite small, and the bevel 44 allows a good underview even with a very small clearance. As mentioned above, the mirror is made as thin as is practically possible because of the limited amount of space between components on PCBs. The mirror must be thin to permit the 45 degree angle needed for 90 degree viewing where the components are very close together.

FIGS. 8 to 11 of the drawings show an alternative configuration of the side viewing mirror which is particularly suitable for use between components which are very close together, as illustrated in FIG. 11. The mirror device 50 shown in FIGS. 8 to 11 basically comprises a thin, strip-like mirror 52 secured to a rounded handle 54 via bent wire shaft 56. The mirror in this embodiment also comprises a front surface mirror with a reflective front surface and a non-reflective rear surface. The opposite elongate straight edges 58, 60 of the mirror each have a beveled rear edge surface 62 as in the first embodiment, suitably at an angle of at least 45 degrees to the plane of the mirror, so that either edge 58 or edge 60 can be placed in contact with the surface of a printed circuit board 14, as shown in FIG. 11 with the adjacent beveled surface resting against the board so that the reflective surface is tilted at an angle of 45 degrees to the optical path 48. The width of the mirror between edges 58 and 60 is suitably of the order of ⅛ inches, and the mirror is preferably made as thin as is practically possible, as in the first embodiment.

As in the first embodiment, the handle 54 is a rounded elongate member for easy gripping by the user. The wire shaft 56 projecting from handle 54 is bent so that when one of the edges 58 or 60 is placed against a flat surface, handle 54 will be out of the optical path and will project at an angle of about 45 degrees to the surface for easy manipulation by the operator. The handle shaft has a first end portion 64 secured to the rear surface of the mirror, a second portion 66 bent at an angle of about 90 degrees to the first end portion, and a third portion 68 bent at an obtuse angle to the second portion 66 and secured coaxially to handle 54. Portion 68 is at an angle of about 45 degrees to the straight mirror edges 58 and 60. As best seen in FIGS. 10 and 11, the mirror 52 is secured to shaft portion 66 with its plane at an angle of about 45 degrees to the plane of the handle and shaft. The arrangement is such that when one of the edges 58 or 60 is placed against a flat surface, the second bent portion 66 will extend vertically upwards to avoid hitting any of the closely packed components, and the portion 68 and handle 54 will extend at about 45 degrees to the surface, out of the optical path.

The mirror device 50 is used in a similar manner to the mirror of the first embodiment to reflect a side view of an object such as an IC component to an observer viewing the component from above via an optical instrument of the type generally used in inspecting PC boards. The mirror device is particularly useful on boards where ICs are placed in rows very close together so that there is less than ⅛ inch clearance between the parts. If the clearance is this small, the mirror device 26 shown in FIGS. 2 to 5 could not be inserted between the parts and tilted to 45 degrees or more without hitting the parts. Thus the mirror 50 is used in such cases, with one of the edges 58 or 60 placed at or close to the board surface and adjacent beveled edge portion 62 lying on or close to the surface, as shown in FIG. 11. The opposite edges 58 or 60 allow either right or left handed manipulation of the mirror via handle 52. With the mirror edge 58 or 60 against the surface facing a side edge of a component 12, it will be automatically angled at 45 degrees to the vertical optical path of an overhead viewing instrument and the handle shaft portion 66 will extend vertically upwards between the parts to avoid hitting any ICs. Portion 68 and handle 54 will extend at 45 degrees to the board 14 for easy manipulation. The bevel 62 adjacent the upper edge 58 of the mirror in FIG. 11 provides additional back clearance to space the mirror from the component adjacent its rear surface.

As seen in FIG. 8, wire shaft 56 is very thin and will have some inherent flexibility. The thinness of the shaft enables the mirror to be used in places where the spacing between components is very limited, and where components are relatively tall and crowded together. The inherent flexibility of the thin wire shaft allows the mirror to be held against the surface, steadying the image, and at the same time reduces the risk of chipping or crushing the mirror as a result of applying too much pressure.

In each embodiment the handle axis is at an angle of about 45 degrees to the straight mirror edge, so that when that edge is placed against a flat surface the handle will project at 45 degrees to the surface for easy manipulation by the user. The straight mirror edges 40, 42 in FIGS. 1 to 7 or 58, 60 in FIGS. 8 to 11 and the bevels 44 or 62 are ground to smooth surfaces in each embodiment of the mirror device to reduce the risk of scratching of the PCB surface and its solder traces.

The side viewing mirror device described above permits viewing of an object through an optical instrument from above and also at 90 degrees to that direction, while keeping both views in focus simultaneously. The object can be viewed from all sides with the mirror tilted at 45 degrees, or at angles greater or less than 45 degrees for viewing at more or less than 90 degrees to the side. The mirror can also be used for oblique viewing by rotating it about the vertical axis. The second version of the mirror device can be used even when components are very closely packed to less than ⅛ inch clearance between the parts. The method of inspection described above can also be used in computerized fault location techniques where PCBs are placed on X-Y scanning tables operated horizontally beneath an optical inspection apparatus, by suitable positioning of the minor to view the side edges of components as they scan past the mirror.

Although a preferred embodiment of the invention has been described above by way of example only, it will be understood by those skilled in the field that modifications may be made to the disclosed embodiment without departing from the scope of the invention which is defined by the appended claims.

I claim:

1. A method of viewing the side of an object mounted on a flat plane surface defining an object plane, comprising the steps of:
   viewing the object from above with a magnifying optical instrument having a vertical optical path;
   holding a side-viewing mirror in the optical path of the instrument via a remote handle with a shaft extending from the handle and secured to the mirror;
   manipulating the handle to place the mirror so that it faces a side edge of the object with a straight bottom edge of the mirror contiguous with the object plane and the mirrored surface extending down to the level of the object plane with the handle and shaft out of the plane of the optical path including the mirror and
   tilting the mirror via the handle to an angle up to about 45 degrees to the optical path to deflect light from the side of the object by at least 90 degrees to present a side view of the object down to the level of the object plane to an observer.

2. The method as claimed in claim 1, including the steps of:
   moving an object comprising a printed circuit board in a predetermined direction beneath the optical viewing instrument;
   viewing components on the board from the above through the viewing instrument while using the handle to position a straight bottom edge of the side-viewing mirror directly adjacent a side edge of a component to be examined and against the surface of the printed circuit board with the bottom edge parallel to the direction of movement of the printed circuit board.

3. The method as claimed in claim 1, wherein the step of tilting the mirror comprises tilting the mirror until a beveled edge portion of the rear surface of the mirror adjacent the bottom edge rests on the object plane.

4. A method of viewing components mounted on a printed circuit board with a gap between the components and the board comprising the steps of:
   viewing one of the components from above with a magnifying optical instrument having a vertical optical path;
   holding a side viewing mirror in the optical path and against the circuit board by manipulating a remote handle secured to the mirror by a shaft to position a straight bottom edge of the mirror against the circuit board so that the reflective surface of the mirror faces a side edge of the components and extends down to the level of the circuit board;
   with the handle and shaft out of the plane of the optical path including the mirror
   tilting the mirror until a beveled edge portion on the rear surface of the mirror is held flat against the circuit board with the mirror surface tilted at an angle of about 45 degrees to the circuit board; and
   viewing the side of the component and the gap beneath the component down
   to the level of the circuit board by deflecting light emitted from the side of the component by at least 90 degrees, presenting simultaneous top and side views of the component to an observer.

* * * * *